(12) United States Patent
Sinha et al.

(10) Patent No.: US 9,832,104 B2
(45) Date of Patent: Nov. 28, 2017

(54) RELIABLE BROADCAST IN A FEDERATION OF NODES

(75) Inventors: Rishi Rakesh Sinha, Bothell, WA (US); Lu Xun, Kirkland, WA (US); Gopala Krishna Reddy Kakivaya, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 12/703,799

(22) Filed: Feb. 11, 2010

(65) Prior Publication Data

US 2011/0194558 A1 Aug. 11, 2011

(51) Int. Cl.
*H04L 12/18* (2006.01)
*H04L 12/761* (2013.01)

(52) U.S. Cl.
CPC .................................. *H04L 45/16* (2013.01)

(58) Field of Classification Search
None
See application file for complete search history.

(56) References Cited

U.S. PATENT DOCUMENTS

| | | | |
|---|---|---|---|
| 5,109,384 A | 4/1992 | Tseung | |
| 2002/0097732 A1* | 7/2002 | Worster | H04L 12/4641 370/408 |
| 2002/0112178 A1* | 8/2002 | Scherr | 713/200 |
| 2002/0120837 A1* | 8/2002 | Maxemchuk et al. | 713/153 |
| 2004/0006650 A1* | 1/2004 | Theimer | G06F 9/542 719/313 |
| 2004/0205105 A1* | 10/2004 | Larsson | H04L 45/00 709/200 |
| 2005/0125626 A1* | 6/2005 | Todd | 711/202 |
| 2005/0144172 A1* | 6/2005 | Kilian et al. | 707/10 |
| 2005/0223102 A1 | 10/2005 | Zhang et al. | |

(Continued)

FOREIGN PATENT DOCUMENTS

WO 2007091219 A1 8/2007

OTHER PUBLICATIONS

Willke, et al., "Coordinated Interaction Using Reliable Broadcast in Mobile Wireless Networks", Retrieved at<<http://citeseerx.ist.psu.edu/viewdoc/download?doi=10.1.1.92.1218&rep=rep1&type=pdf>>,2006.

(Continued)

*Primary Examiner* — Duc Duong
(74) *Attorney, Agent, or Firm* — Davin Chin; Chin IP, PLLC

(57) ABSTRACT

Architecture that provides reliable communications of broadcast data (e.g., a message) in a collection of nodes. Each node in the collection is assigned a range of identifiers in a token. The union of the tokens for all nodes is the entire identifier range space. Each node that receives a reliable broadcast message from an originator node acknowledges receipt of the message using its token. One or more intermediate nodes forward the message from the originator node to other nodes with which the originator node has no direct communications (multi-level node structure). The indirect nodes each send acknowledgements back to the parent nodes (which can be an intermediate node) which combine the tokens to ensure the entire range space for the associated assigned token range is covered. The originator node ultimately receives tokens to compute if all nodes have received the message.

25 Claims, 7 Drawing Sheets

(56) References Cited

U.S. PATENT DOCUMENTS

| | | | |
|---|---|---|---|
| 2006/0271731 A1* | 11/2006 | Kilian et al. | 711/108 |
| 2007/0002774 A1* | 1/2007 | Hasha et al. | 370/258 |
| 2007/0268868 A1 | 11/2007 | Singh et al. | |
| 2007/0283026 A1 | 12/2007 | Lohmar et al. | |
| 2008/0002640 A1* | 1/2008 | Westphal | 370/338 |
| 2008/0008138 A1* | 1/2008 | Pun | H04W 74/0841 |
| | | | 370/338 |
| 2008/0013501 A1* | 1/2008 | Keshavarzian | H04L 1/08 |
| | | | 370/338 |
| 2008/0225811 A1 | 9/2008 | Wentink | |
| 2008/0247408 A1 | 10/2008 | Yoon et al. | |
| 2008/0288659 A1* | 11/2008 | Hasha et al. | 709/250 |
| 2009/0135750 A1* | 5/2009 | Ratiu et al. | 370/310 |
| 2009/0248712 A1* | 10/2009 | Yuan | 707/100 |
| 2009/0327443 A1* | 12/2009 | Pawar et al. | 709/207 |
| 2010/0235882 A1* | 9/2010 | Moore | 726/3 |
| 2010/0262717 A1* | 10/2010 | Critchley et al. | 709/251 |
| 2010/0322256 A1* | 12/2010 | Riley et al. | 370/400 |
| 2010/0325190 A1* | 12/2010 | Riley et al. | 709/201 |
| 2011/0082928 A1* | 4/2011 | Hasha et al. | 709/224 |
| 2011/0167483 A1* | 7/2011 | Lee et al. | 726/6 |
| 2011/0176529 A1* | 7/2011 | Budampati et al. | 370/338 |
| 2016/0359588 A1* | 12/2016 | Pawar | H04L 1/1607 |

OTHER PUBLICATIONS

Segall, et al., "A Reliable Broadcast Algorithm",Retrieved at<<http://dspace.mit.edu/bitstream/handle/1721.1/1013/P-1177-15635206.pdf?sequence=1>>, Jan. 1982.

Lou, et al., "A Reliable Broadcast Algorithm with Selected Acknowledgements in Mobile Ad Hoc Networks",Retrieved at<<http://citeseerx.ist.psu.edu/viewdoc/download?doi=10.1.1.123.3544&rep=rep1&type=pdf>>, Dec. 1-5, 2003.

Lou , et al., "Double-Covered Broadcast (DCB): A Simple Reliable Broadcast Algorithm in MANETs" Retrieved at<<http://cial.csie.ncku.edu.tw/2005pdf/Double-covered%20broadcast%20(DCB)-a%20simple%20reliable%20broadcast%20algorithm%20in%20MANETs.pdf>>,2004.

* cited by examiner

RELIABLE BROADCAST IN A FEDERATION OF NODES

BACKGROUND

Advances in computer technology and the general mobility of users and expansiveness of corporate enterprises have generally contributed to the increase in computer applications in various industries in order to provide more efficient and effective communications and data handling. Server systems are utilized in ways that improve the efficiency and reliability in not only making information available but also communicating information between servers.

A database is an organized collection of information with data structured such that a program can quickly search and select desired pieces of data, for example. In many deployments, the database is distributed across many machines for access and reliability.

A federation is collection of nodes that are part of a distributed system, where one node does not necessarily know about some or all the other nodes. In such a scenario, a problem exists in the reliable communications (e.g., broadcast) of data (e.g., a message) in a way that ensures that all the nodes that are alive at a particular time in the distributed system receive the message.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the reliable communications of broadcast data (e.g., a message) in a collection of nodes (e.g., a federation). Each node, as it joins the collection, is assigned a token that comprises a sub-range of identifiers (e.g., numbers) in an entire identifier range space. The union of the tokens for all nodes (in a stable system) is the entire identifier range space. The token range assigned to a node changes as nodes join/depart the collection. A broadcast ownership range is also utilized and is more efficient and effective for broadcasting the data.

In the context of messages, each node that receives a reliable broadcast message from an originator node acknowledges receipt of the message using its token. For every broadcast, there can be a different originator node, which assigns the responsible broadcast ownership ranges for nodes to which the broadcast message is sent. These nodes perform the same operation if propagating the message further. Thus, the scope of the broadcast ownership range is only for a given broadcast and each node is assigned its broadcast ownership range after receiving the message.

There can be multiple levels of nodes (e.g., in parent-child relationships) where not every node is in direct communication with the other nodes, such as the originator node. In other words, one or more intermediate nodes (routing nodes, which can be referred to as sender nodes) can exist that forward the message (e.g., from the originator node) to other indirect (child) nodes with which the originator node has no direct communications. The indirect nodes each send acknowledgements back to parent nodes (e.g., the intermediate node), which then indicate receipt of the message.

The intermediate node, having an assigned token, compares the received tokens of its child nodes to the broadcast ownership range to ensure that all associated child nodes have reported as receiving the message. If not all associated child nodes have reported to the intermediate node, the intermediate node can execute a retry algorithm to resend the message to nodes within its assigned broadcast ownership range that did not respond with acknowledgements. The retry algorithm can execute to resend the message after a predetermined time period, for example.

If all nodes associated with the intermediate node have reported acknowledgement, the intermediate node then sends a single consolidated acknowledgement as its assigned token to its parent node (which can be the originator node). This consolidation process (and perhaps message retry) then continues upward, eventually reaching the originator node. The originator node then computes if the message broadcast was successful to all targeted nodes.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
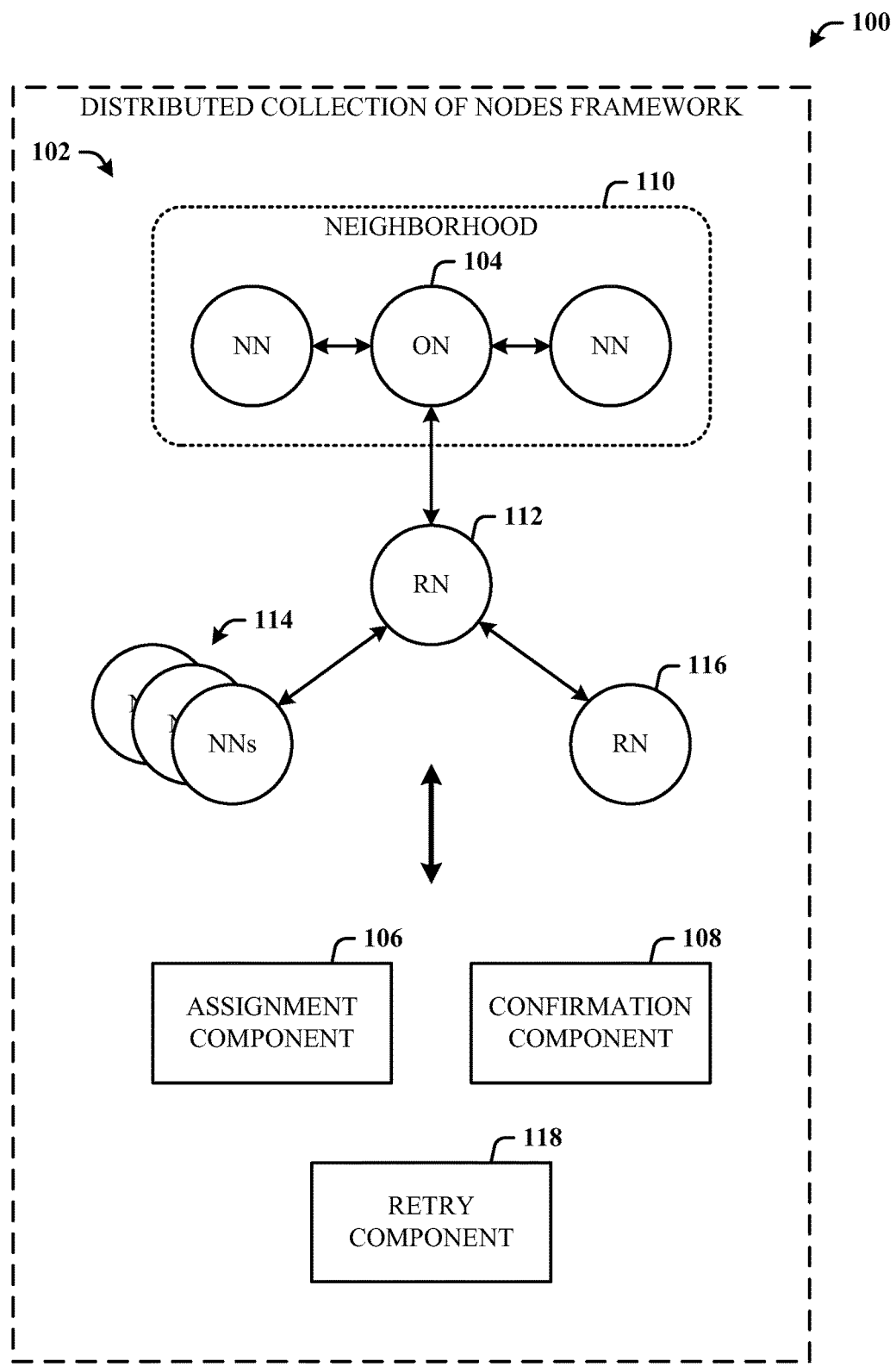
FIG. 1 illustrates a computer-implemented communications system in accordance with the disclosed architecture.

The disclosed architecture is a token-based scheme which ensures the accountability that broadcast data (e.g., message) has reached all targeted nodes of a collection (e.g., a federation). Each node in the collection is assigned a token. Each token is a range of identifiers, a sub-range in the entire range of identifiers. The union of all tokens sums to the entirety of all identifiers (e.g., numbers) in the range of identifiers. Broadcast reliability is accomplished based on the tokens and broadcast ownership range accountability. Rather than achieve this accountability by flooding a single originator of the message with confirmations (acknowledgments) that the message was delivered to the target nodes, the task of processing the confirmations from the many nodes is shared by nodes in the collection. Thus, the result is that the originator node will receive significantly less acknowledgement traffic that furthers a goal of determining the state of reliable message broadcasting while reducing or eliminating adverse impact on performance at the originator node.

The node collection can be a part of a federation, which represents a distributed collection of nodes, where not every node necessarily knows about all of the other nodes. In general, the federation can include organizations that have established trust for shared access to a set of resources. At no time will any two nodes claim ownership of the same token. Moreover, a message destined to the nodes of a given broadcast ownership range can only be accepted only by the nodes in that broadcast range.

The nodes participating in the collection (or federation) are a sorted list using a binary relation that is reflexive, anti-symmetric, transitive, total, and defined over the domain of node identities. For example, both ends of the sorted list can be joined, thereby forming a circular topology (ring). This provides for each node in the list to view itself as being at the middle of the sorted list. Moreover, the list can be doubly linked such that a node can traverse the list in either direction. Still further, a one-to-one mapping function can be defined from the value domain of the node identities to the nodes. The ring, as associated with a federation, can include of a set of nodes that cooperate to form a dynamic and scalable network such that information can be systematically and efficiently disseminated and located.

Each node x maintains a neighborhood h of nodes (where h is an integer), where the neighborhood h overlays both sides the node x, and where n(x) denotes the set of neighbor nodes for the node x. A neighborhood edge is a node in the set n(x) that is furthest away from node x. Each node has a pair of neighborhood edges that define the neighborhood n(x). If a node y is in the set n(x) of neighbor nodes, y is referred to as being in the neighborhood of node x. If node y is closer to node x than a neighborhood edge of node x, node y is said to be within the neighborhood of node x. It is to be appreciated that it is possible for node y to be within the neighborhood of node x, but not in the neighborhood of node x, if node x is not aware of the existence of node y. For a node x, if there exists another ready node y that is within the neighborhood of node x, then node y is in the neighborhood of node x.

Each active node participating in the collection is assigned a token, which comprises a range of natural numbers, for example, that are between zero and some appropriately chosen upper bound, inclusive. The token assigned to a node functions as the node identity in the collection (e.g., a ring). Routing consistency can be achieved via assignment and ownership of tokens.

The range of identifiers encompassed by any two tokens is disjoint, as are all tokens. A token having a range of identifiers can be split into multiple tokens the range of identifiers for each when taken together comprise the entire range of the token that was split. Two or more adjacent tokens can be merged into a single token such that union of the ranges of identifiers of the two tokens is then the whole range for the resulting merged token. A node owns a token that includes at least its identifier. A routing node (intermediate), as any collection node, owns a single token.

As previously indicated, a token operation can include token splitting (as well as token creation, token merger, and token recovery). In one implementation, an initial seed node in the collection creates a valid token of all identifiers for the entire node identifier space (e.g., sixty-four nodes). Any joining node attempts to acquire its token from an existing closest routing node as the closest routing node owns the identifier for the joining node. The joining node locates the closest routing node by routing a token request message to its own identifier. When a routing node receives a token request from a non-routing node with an identifier of x, routing node splits the routing node token using the midpoint of its own identifier and x as the partition point, and transfers the token containing x to the joining node while retaining the other token. Every routing node can periodically talk to its immediate neighbor nodes so that the routing node has numerous chances to perform the splitting process.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented communications system 100 in accordance with the disclosed architecture. The system 100 includes a distributed collection 102 of nodes, where a node can be an originator node 104 that broadcasts a message to other nodes of the collection 102. The system 100 can further include an assignment component 106 that assigns distinctive ranges of identifiers to nodes as tokens. The assignment component 106 cooperates with the originator node 104 to assign the identifiers, identifier ranges, and tokens. In other words, a token includes the range of identifiers in which a node identifier is included.

A confirmation component 108 of the system 100 is employed to determine if the message was received by the other nodes based on the associated tokens and a broadcast ownership range. Thus, the originator node 104 can determine the reliable broadcast of its message as confirmed by the confirmation component 108.

A distinctive range of identifiers is assigned in a token that identifies nodes in a neighborhood 110. Additionally, distinctive ranges of identifiers (as tokens) identify routing nodes (e.g., a routing node (RN) 112) of the collection 102. A routing node further divides an associated token of identifiers into sub-ranges of identifiers for associated neighbors 114 and other routing node(s) 116.

A set of tokens from the associated neighbors 114 and routing partner node(s) 116 is accumulated at an intermediate (parent) node (e.g., the routing node 112) based on a broadcast range assigned to the routing node. Only nodes associated with that routing node and defined in the broadcast range can for that routing node are targeted to receive the message. The intermediate node determines if the message was received at each of the associated neighbors 114 and routing nodes 116. If all neighbor nodes 114 and routing node(s) 116 have responded with an acknowledgment of message receipt to the intermediate node (routing node 112), the intermediate node consolidates these acknowledgements into a single consolidated acknowledgement that is then sent to the originator node 104.

In other words, the originator node 104 can declare reliable broadcast of the message to all targeted nodes based on acknowledgements received from a subset of the other nodes, since the single consolidated acknowledgement represents other nodes. The confirmation component 108 receives separate acknowledgements (from the neighbors 114) and consolidated acknowledgements from the other nodes using the tokens.

The system 100 can further comprise a retry component 118 that resends the message to one or more nodes from which acknowledgements of message receipt are not received. For example, if the message receipt was not acknowledged from the routing node(s) 116, as indicated in the consolidated acknowledgement to the originator node 104, the retry component 118 cooperates with the originator node 104 to resend the message to the routing node 112. The routing node 112 then sends the message to the child routing node(s) 116. This retry can occur after a predetermined period of time (e.g., a timeout value). Moreover, the retry can be performed several times (e.g., three) before the target node is determined to be offline or inaccessible.

Figure 2:
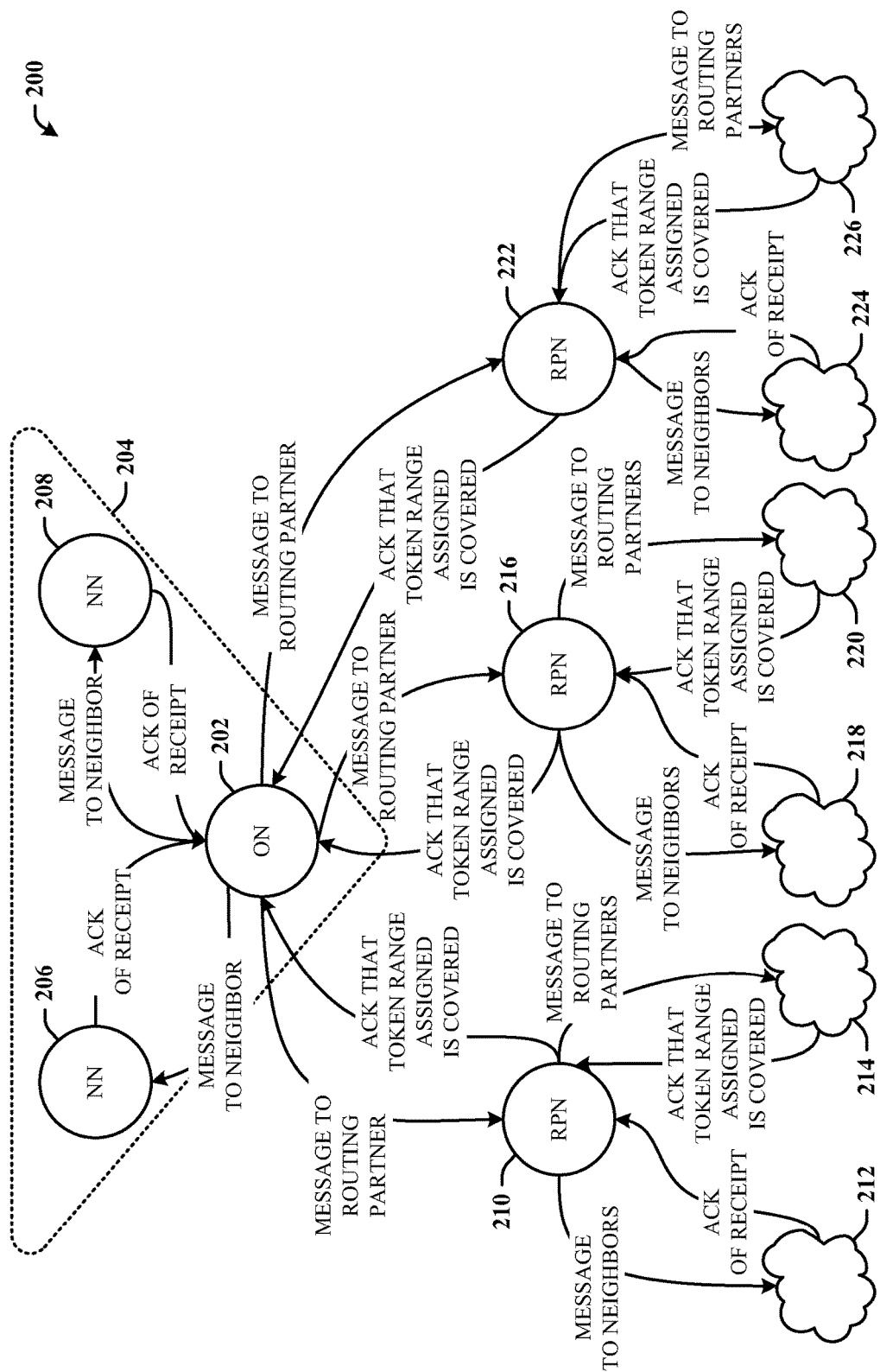
FIG. 2 illustrates a flow diagram of communications between nodes in the collection of nodes.

FIG. 2 illustrates an interactive flow diagram 200 of communications between nodes in the collection of nodes. A node can have direct communications (with other nodes) and indirect communications (through other nodes). Each of the nodes is assigned a token, which range of identifiers is based on the total number of nodes in the collection. For example, an originator node (ON) 202, that initiates the sending of a message to other nodes, has an assigned ON token, the range of which includes a neighborhood 204 of nodes defined thereabout. Thus, the neighborhood 204 not only includes the originator node 202, but also a first neighborhood node (NN) 206 and a second neighborhood node 208. Note that any node that receives and forwards a message is referred to as a sender node, which can be any node that forwards a message (or data), except the originator node 202.

The originator node 202 also sends the message to routing partner nodes (RPNs) (also referred to herein as routing nodes, e.g., in FIG. 1), which serve as "proxy" nodes on behalf of the originator node 202 to handle message communications to other nodes not in direct communication (or interaction) with the originator node 202. For example, a first routing partner node 210 is assigned a first RPN token having a distinctive identifier range (in which its identifier is included) and handles messaging from the originator node 202 to child nodes, for example, a first set of neighbor nodes 212 and a first set of routing partner nodes 214. Similarly, a second routing partner node 216 is assigned a second RPN token having a distinctive identifier range and handles messaging from the originator node 202 to child nodes that include a second set of neighbor nodes 218 and a second set of routing partner nodes 220, and a third routing partner node 222 is assigned a third RPN token and handles messaging from the originator node 202 to child nodes that include a third set of neighbor nodes 224 and a third set of routing partner nodes 226.

The originator node 202 creates and splits the entire range of identifiers to be assigned to nodes into multiple sub-ranges as follows: one token that covers a range of identifiers for all the nodes in the neighborhood, and one token for each routing partner that includes a distinctive range of identifiers per routing partner. The originator node 202 then sends (broadcasts) a message targeted to specific nodes or all nodes such as, for example, to each of the neighbor nodes (206 and 208) and each of the routing partner nodes (210, 216, and 222). The targeted neighbor nodes (206 and 208) can directly respond to the originator node 202 with an acknowledgment (Ack) response as the token that covers the neighborhood 204 when the message is received.

As part of sending the message, each of the routing partner nodes (210, 216, and 222) is assigned a respective broadcast range of child nodes over which to be responsible for sending the message and for which the broadcast of the message for that broadcast range is reliable. When receiving an assigned token, a routing partner can divide the token in the same way as the sending node to account for child nodes. Only nodes in the broadcast range for the routing partner are considered for receiving the message from the routing partner. If the broadcast range assigned for message broadcast is a subset of neighborhood range of identifiers in the token, the message is sent to the neighbors only.

Once an intermediate node (e.g., a routing partner node 210) receives responses from its neighbors (e.g., neighbor nodes 212) and the routing partners (e.g., routing partner nodes 214), as specified in the broadcast range, the intermediate node ensures that the assigned broadcast range is completed, and sends an Ack to the parent node (the originator node 202) that sent the message. Subsequent parent receiving nodes (on the way to the originator node 202) operate the same, except if a receiving node is the originator node 202, a completed reliable broadcast can be declared once Acks have been confirmed as received from all the targeted nodes (routing partner nodes, neighbor nodes) to which the message was sent.

In contrast to existing systems, in this scenario, any intermediate node (e.g., routing partner node) can issue a resend message (a retry) based on a timeout calculated and further based on the broadcast retry interval. The retry can be via a routed message to the middle point of the missing range, for example. Since all nodes (parent and child) do not send an Ack directly to the originator node 202, but to the parent sender, the Ack implosion problem that could otherwise occur at the sending node, does not occur.

In operation, after all tokens (and identifier ranges) have been assigned and subdivided, consider that the originator node 202 chooses to broadcast a message to its neighbor nodes (206 and 208) (denoted "Message To Neighbor") and one or more nodes associated with the routing partner nodes (210, 216, and 222) (denoted "Message To Routing Partner"). As part of sending the message, the broadcast range for the neighborhood 204 and each of the routing partner nodes (210, 216, and 222) is also provided. Each of the neighbor nodes (206 and 208) responds with an Ack that the message was received (denoted "Ack of Receipt"). Thus, it is ensured that the neighbor nodes (206 and 208) received the message.

When the routing partner nodes (210, 216, and 222) receive the message, the routing partner nodes (210, 216, and 222) become sender nodes relative to corresponding child nodes, the child neighbor nodes and corresponding child routing partner nodes of the given routing partner node. Thus, the originator node 202 sends the message to the first RPN 210, and the first RPN 210 sends the message to the associated and targeted child neighbor nodes 212 and to the associated and targeted child routing partner nodes 214. Each of the neighbor nodes 212, where targeted, responds with the Ack to the first RPN 210 that the message was received. Similarly, the one or more routing targeted partner nodes 214 each also respond to the first RPN 210 with an Ack that the nodes of responsibility in the assigned broadcast range are responsive to the message receipt. The first RPN 210 then responds to the originator node 202 with a single Ack that indicates all targeted nodes in the broadcast range of responsibility for the first RPN 210 have received the message.

In other words, the originator node 202 assigns tokens to all available (accessible) nodes, which include nodes of routing partners, child nodes of routing partner nodes that are further routing partner nodes for other child nodes, and so on down the line, as well as all neighbor nodes of these RPNs.

Thus, initially, all accessible nodes are assigned tokens. It may be the case that some nodes are not online when the tokens are assigned. It may also be the case that once assigned, a node becomes inaccessible or departs the collection. Thus, these nodes will not be able to respond via the Ack that the message was received. This loss is then passed up the line though parent nodes (e.g., routing partner nodes), for example, as "holes" in the total range of tokens assigned.

Similarly, the originator node 202 sends the message to the second RPN 216, and the second RPN 216 forwards the message to the associated child neighbor nodes 218 and to the associated child routing partner nodes 220 targeted in the broadcast range. Each of the neighbor nodes 218 responds directly with the Ack to the second RPN 216 that the message was received. Similarly, the one or more routing partner nodes 220 targeted in the broadcast range also respond to the second RPN 216 with an Ack that the nodes of responsibility in the assigned broadcast range are responsive to the message receipt. The second RPN 210 then responds to the originator node 202 with a single Ack that indicates all nodes in the broadcast range of responsibility for the second RPN 216 have received the message.

Lastly, the originator node 202 sends the message to the third RPN 222, and the third RPN 222 forwards the message to the associated neighbor nodes 224 and to the associated routing partner nodes 226 identified in the assigned broadcast range. Each of the neighbor nodes 224, where available, responds with the Ack directly to the third RPN 222 that the message was received. Similarly, the one or more routing partner nodes 226 targeted in the assigned broadcast range for the third RPN 222 also respond to the third RPN 222 with an Ack that the nodes of responsibility in the assigned broadcast range are responsive to the message receipt. The third RPN 222 then responds to the originator node 202 with a single Ack that indicates all nodes for which the third RPN 222 is responsible have received the message.

Note that, as previously described, the message is broadcast from the originator node 202 to all nodes having assigned broadcast ranges. Moreover, a routing partner node can operate independently and asynchronously such that there is no set order in which the routing partner node handles associated neighbor nodes and routing partner nodes, individually, relative to other nodes, and issues the Ack (or lack thereof) to the originator node 202.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
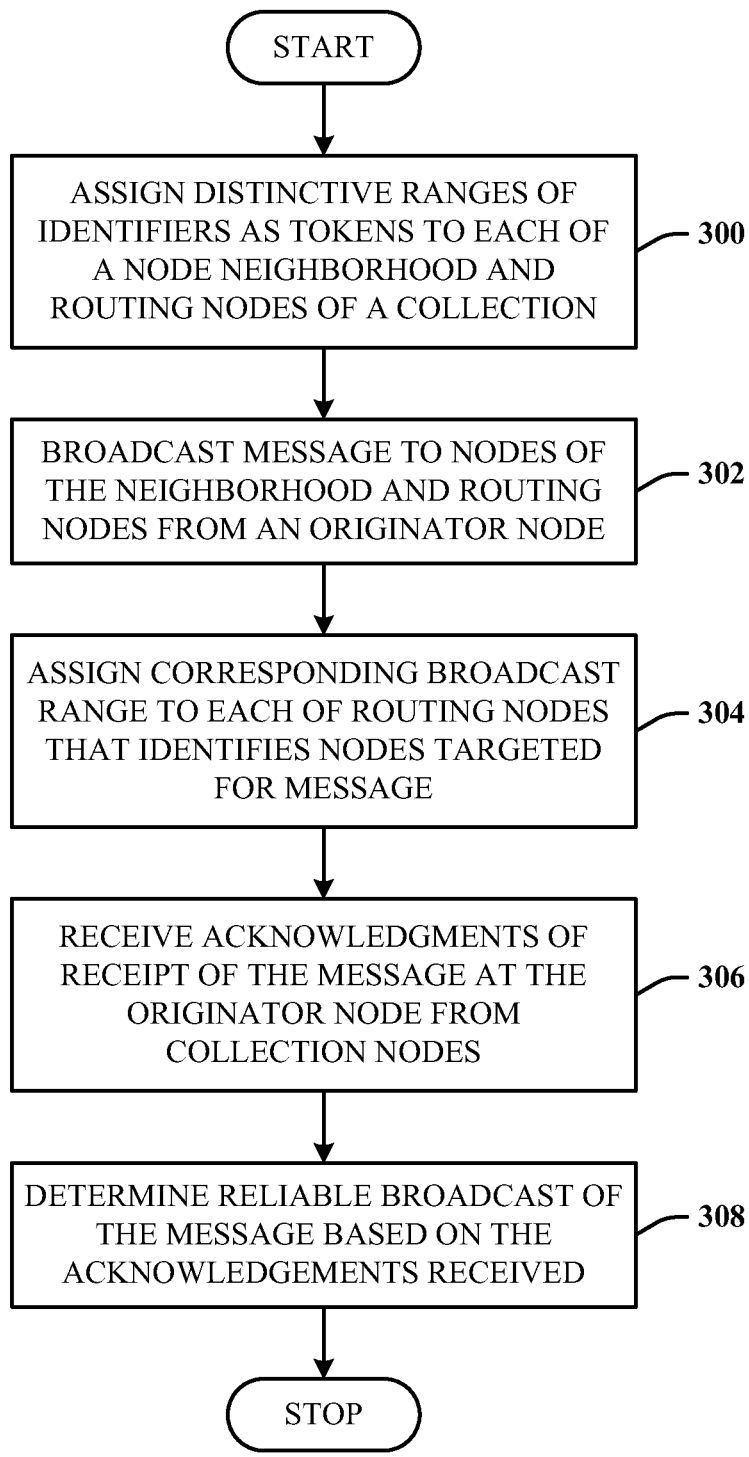
FIG. 3 illustrates a computer implemented communications method in accordance with the disclosed architecture.

FIG. 3 illustrates a computer implemented communications method in accordance with the disclosed architecture. At 300, distinctive ranges of identifiers as tokens are assigned to each of a node neighborhood and routing nodes of a collection. At 302, a message is broadcast from an originator node to nodes of the neighborhood and routing nodes. At 304, a corresponding broadcast range is assigned to each of the routing nodes that identifies nodes targeted for the message. At 306, acknowledgments of receipt of the message are received at the originator node from collection nodes. At 308, reliable broadcast of the message is determined based on the acknowledgements received.

Figure 4:
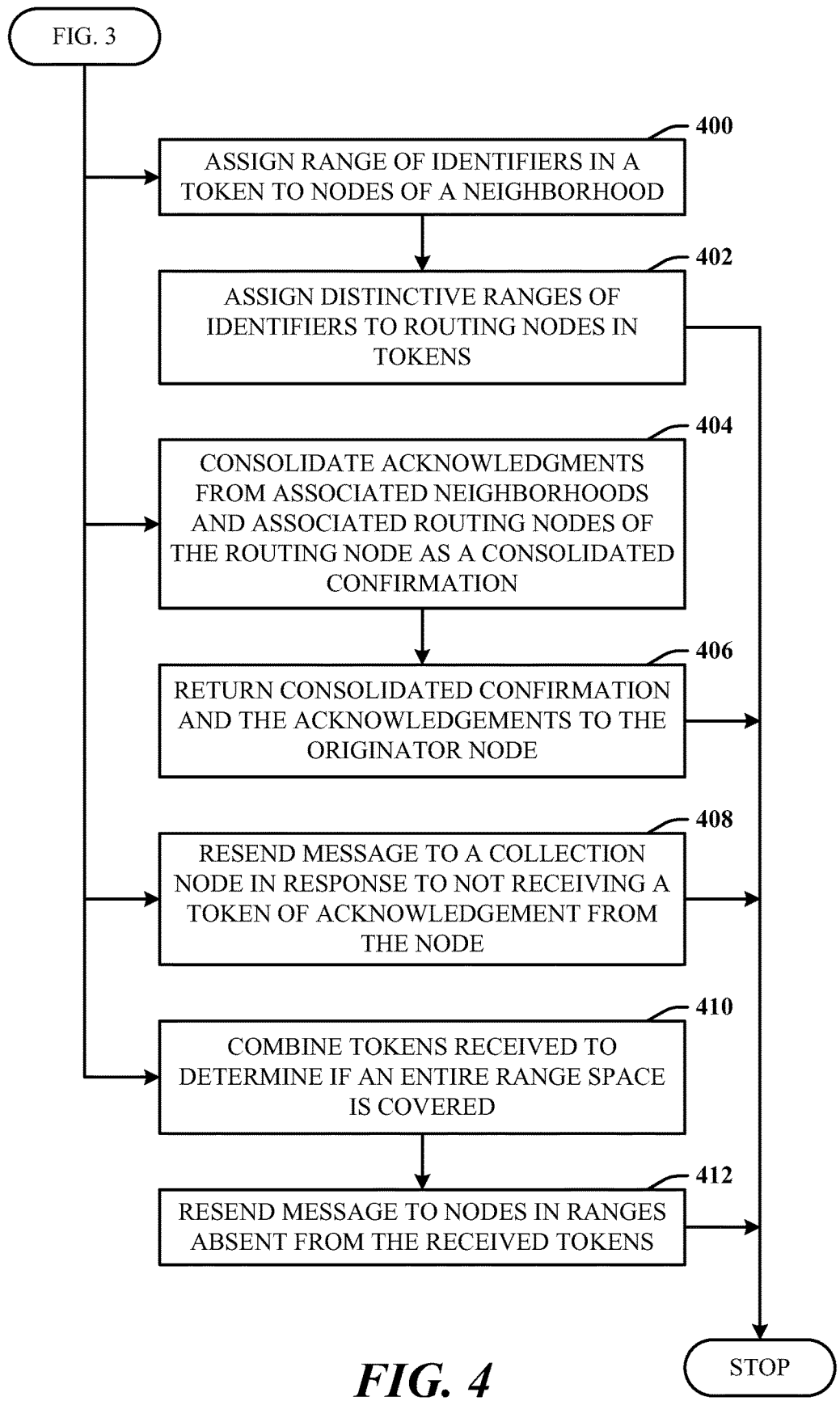
FIG. 4 illustrates additional aspects of the method of FIG. 3.

FIG. 4 illustrates additional aspects of the method of FIG. 3. At 400, a range of identifiers is assigned in a token to nodes of a neighborhood. At 402, distinctive ranges of identifiers are assigned to routing nodes in tokens. At 404, acknowledgments from associated neighborhoods and associated routing nodes of the routing node are consolidated as a consolidated confirmation. At 406, the consolidated confirmation and the acknowledgements are returned to the originator node. At 408, the message is resent to a collection node in response to not receiving a token of acknowledgement from the node. At 410, tokens received to determine if an entire range space is covered are combined. At 412, the message is resent to nodes in ranges absent from the received tokens.

Figure 5:
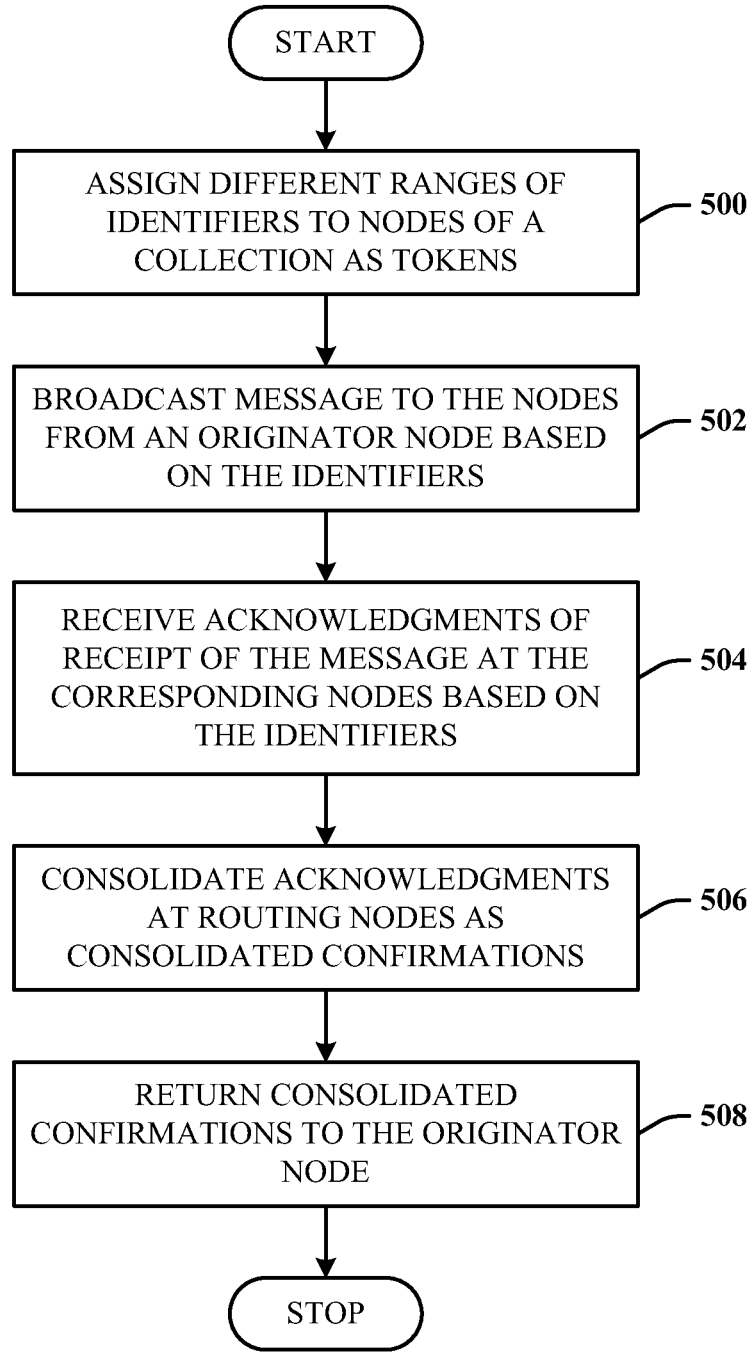
FIG. 5 illustrates an alternative communications method.

FIG. 5 illustrates an alternative communications method. At 500, different ranges of identifiers are assigned to nodes of a collection as tokens. At 502, a message is broadcast to the nodes from an originator node based on the identifiers. At 504, acknowledgments of receipt of the message at the corresponding nodes are received based on the identifiers. At 506, acknowledgments are consolidated at routing nodes as consolidated confirmations. At 508, the consolidated confirmations are returned to the originator node.

Figure 6:
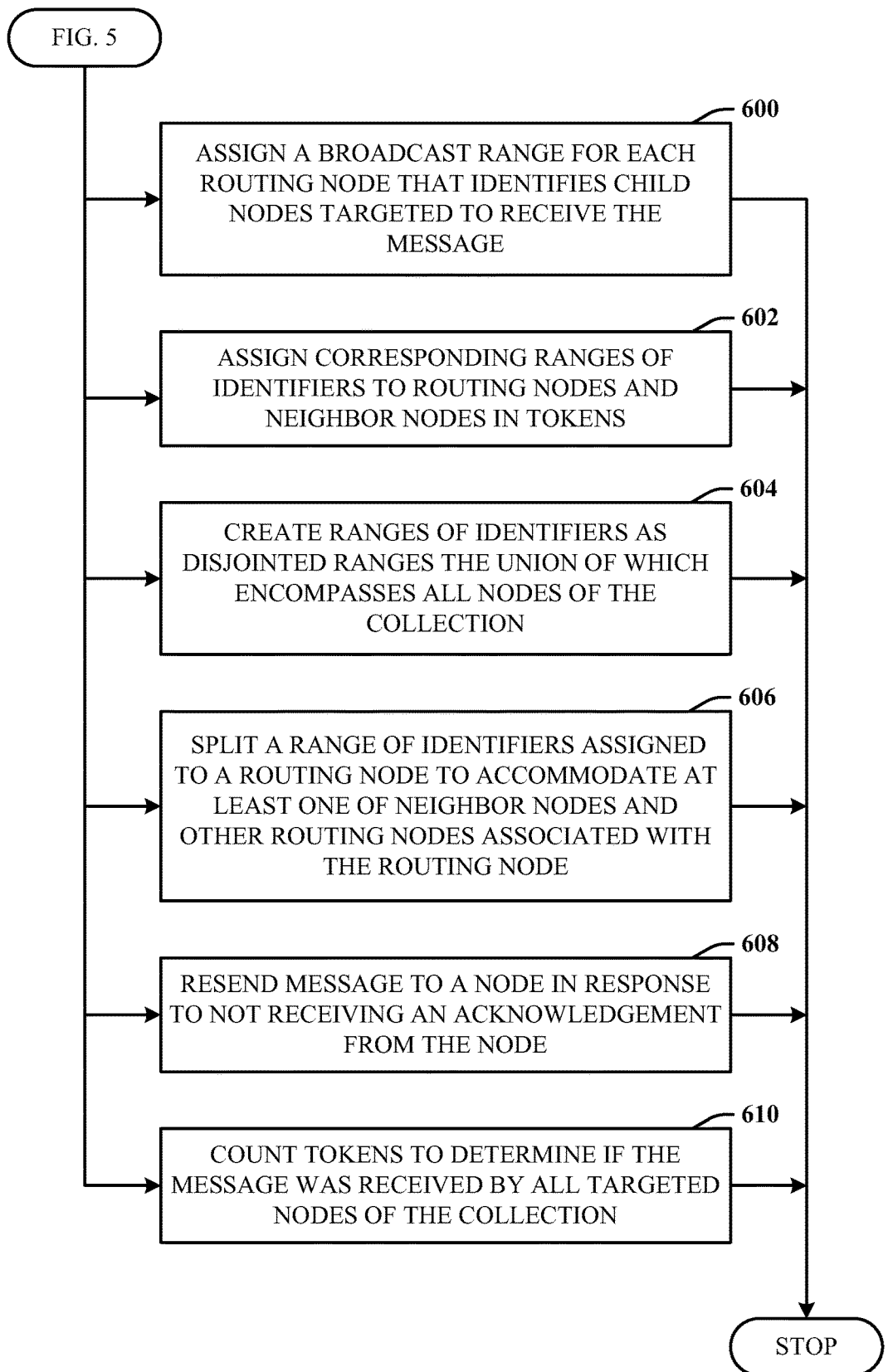
FIG. 6 illustrates additional aspects of the method of FIG. 5.

FIG. 6 illustrates additional aspects of the method of FIG. 5. At 600, a broadcast range is assigned to each routing node that identifies child nodes targeted to receive the message. At 602, corresponding ranges of identifiers are assigned to routing nodes and neighbor nodes in tokens. At 604, the ranges of identifiers are created as disjointed ranges the union of which encompasses all nodes of the collection. At 606, a range of identifiers assigned to a routing node is split to accommodate at least one of neighbor nodes and other routing nodes associated with the routing node. At 608, the message is resent to a node in response to not receiving an acknowledgement from the node. At 610, the tokens are counted to determine if the message was received by all targeted nodes of the collection.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
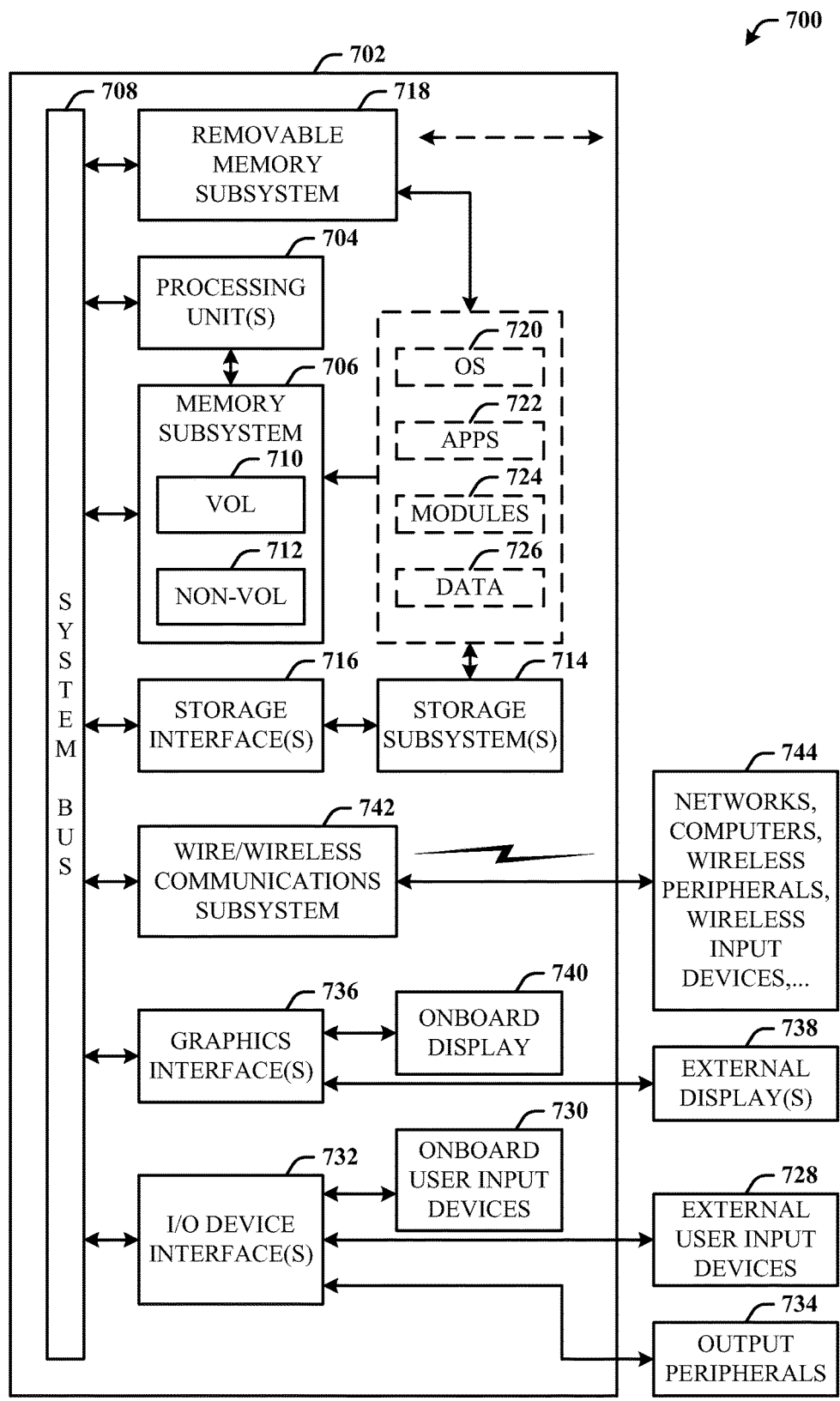
FIG. 7 illustrates a block diagram of a computing system that to executes reliable broadcast in a collection of nodes in accordance with the disclosed architecture.

Referring now to FIG. 7, there is illustrated a block diagram of a computing system 700 that to executes reliable broadcast in a collection of nodes in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the interactive flow diagram 200 of FIG. 2, and the methods represented by the flow charts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
   a memory and a hardware processor, wherein the memory and the hardware processor are respectively configured to store and execute computer-executable instructions, wherein the instructions upon execution cause the computing device to perform operations, the operations comprising:
      broadcasting a message to nodes of a collection of nodes;
      assigning distinctive ranges of identifiers to the nodes as tokens, wherein a set of tokens from at least one of neighbor nodes or routing nodes, of the collection of nodes, is accumulated at an intermediate node, and wherein the intermediate node determines if the message has been received at each of the at least one of the neighbor nodes or the routing nodes;
      receiving at least one separate acknowledgement and at least one consolidated acknowledgement from the nodes of the collection of nodes using the set of tokens;
      determining if the message was received by a particular node of the collection nodes based on the set of tokens; and
      declaring reliable broadcast of the message based on the at least one separate acknowledgement and the at least one consolidated acknowledgement from the nodes of the collection.

2. The computing device of claim 1, wherein a distinctive range of identifiers is a token that identifies nodes in a neighborhood.

3. The computing device of claim 1, wherein the tokens include distinctive ranges of identifiers that identify routing nodes of the collection.

4. The computing device of claim 3, wherein a routing node is configured to broadcast the message to associated child nodes identified in a broadcast range assigned to the routing node.

5. The computing device of claim 1, wherein the operations further comprise:
   resending the message to one or more nodes from which acknowledgements of message receipt are not received.

6. A method, the method comprising acts of:
   receiving a message broadcast from an originator node to nodes of a neighborhood and routing nodes, of a collection of nodes, wherein each neighbor node of the neighborhood and each routing node is assigned a distinctive range of identifiers as a token;
   receiving a corresponding broadcast range that identifies nodes targeted for the message;
   consolidating acknowledgments of receipt of the message from multiple nodes of the neighbor nodes and the routing nodes, as a consolidated confirmation of acknowledgments from the multiple nodes that received the message;
   returning the consolidated confirmation to the originator node that broadcasts the message, wherein the consolidated confirmation represents receipt of the message by the nodes associated with the routing node that were targeted for the message; and
   resending the message to nodes in ranges absent in the consolidated confirmation.

7. The method of claim 6, further comprising resending the message to a node of the collection in response to not receiving a token of acknowledgement from the node of the collection.

8. A computer-implemented communications method executing with a processor and memory, the method comprising:
   receiving a broadcast message at a routing node of a collection of nodes, wherein each node of the collection is assigned a distinctive range of identifiers as a token;
   routing the broadcast message to targeted nodes based on a routing token, the targeted nodes comprising at least nodes in a neighborhood of the routing node and other nodes;
   receiving acknowledgments of receipt of the message from at least some of the targeted nodes;
   determining which of the targeted nodes received the message based on the acknowledgments of receipt;
   consolidating the acknowledgments into a consolidated confirmation;
   returning the consolidated confirmation;
   receiving broadcast identifiers; and
   splitting the broadcast identifiers to accommodate at least one of neighbor nodes or other routing nodes.

9. The method of claim 8, further comprising receiving a broadcast range assignment that identifies child nodes targeted to receive the message.

10. The method of claim 8, further comprising receiving the broadcast identifiers at routing nodes and at neighbor nodes.

11. The method of claim 8, further comprising creating the ranges of identifiers for nodes as disjointed ranges the union of which encompasses all the nodes of the collection.

12. The method of claim 8, further comprising resending the message to a particular targeted node in response to not receiving an acknowledgement from the particular targeted node.

13. The method of claim 8, further comprising assigning the ranges of identifiers to nodes of the collection as tokens and counting the tokens to determine if the message was received by all targeted nodes of the collection.

14. A computer-readable physical storage device having computer-executable instructions stored therein, that when executed by a processor cause a computing device to perform actions, the actions comprising:
broadcasting a message to nodes of a collection of nodes;
assigning distinctive ranges of identifiers to the nodes as tokens, wherein a set of tokens from at least one of neighbor nodes or routing nodes of the collection of nodes is accumulated at an intermediate node, and the intermediate node determines if the message has been received at each of the at least one of neighbor nodes or the routing nodes;
receiving at least one separate acknowledgement and at least one consolidated acknowledgement from the nodes of the collection of nodes using the set of tokens;
determining if the message was received by a particular node of the collection nodes based on the set of tokens; and
sending a consolidated confirmation representing delivery of the broadcast to a plurality of the neighbor nodes or routing nodes based on the set of tokens.

15. A computer-implemented communications method of managing a distributed collection of nodes having an originator node that broadcasts a message to other nodes of the collection, comprising acts of:
assigning distinctive ranges of identifiers to the nodes as tokens;
accumulating a set of tokens from associated neighbor nodes or routing nodes at an intermediate node;
determining, at the intermediate node, if the message has been received at each of the associated neighbor nodes or routing nodes based on the accumulated set of tokens; and
sending a consolidated confirmation representing delivery of the broadcast to a plurality of the associated neighbor nodes or routing nodes based on the accumulated set of tokens.

16. A computer-readable physical storage device comprising computer-executable instructions that when executed by a processor, cause the processor to perform a method comprising acts of:
receiving a message broadcast from an originator node to neighbor nodes of a neighborhood and routing nodes of a collection of nodes, wherein each neighbor node of the neighborhood and each routing node are associated with distinctive ranges of identifiers as tokens;
receiving a corresponding broadcast range that identifies nodes targeted for the message;
accumulating at an intermediate node a set of tokens from neighbor nodes or routing nodes;
determining at the intermediate node, if the message has been received at each of the neighbor nodes or routing nodes based on the accumulated set of tokens;
sending a confirmation to the originator node that represents receipt of the message by the nodes targeted for the message; and
resending the message to at least one node for which receipt of the message was not determined to have been received.

17. A computer-implemented communications system, comprising:
routing nodes configured to receive a message broadcast from an originator node to neighborhood nodes and other routing nodes, wherein the other routing nodes and neighborhood nodes each receive a corresponding broadcast range that identifies nodes targeted to receive the broadcast message, and the other routing nodes each send a confirmation to the originator node which represents that corresponding targeted child nodes received the message; and
intermediate nodes each configured to accumulate confirmations from the other routing nodes and neighborhood nodes in corresponding broadcast ranges that are targeted to receive the broadcast message, the intermediate nodes determine if the message has been received at each of the associated neighbor nodes or the routing nodes, the intermediate nodes send consolidated confirmations to the originator node as to delivery of the broadcast.

18. A computer-readable physical storage device comprising computer-executable instructions that when executed by a processor, cause the processor to perform a method comprising acts of:
receiving a broadcast message at a routing node and nodes of a neighborhood of the routing node, of a collection of nodes, wherein each node of the collection is assigned a distinctive range of identifiers as a token;
routing the broadcast message to targeted nodes comprising the nodes of the neighborhood and other nodes based on a routing token;
receiving acknowledgments of receipt of the message from targeted nodes;
determining which of the targeted nodes received the message based on the acknowledgments of receipt;
consolidating the acknowledgments as a consolidated confirmation; and
transmitting the consolidated confirmation to an originator of the broadcast message, wherein the consolidated confirmation represents receipt of the message by the nodes associated with the routing node that were targeted for the message.

19. A computer-implemented communications method, comprising acts of:
after all nodes are joined in a collection of nodes, receiving a message and a corresponding broadcast range with the message, from an originator node, the broadcast range identifies nodes targeted for the message, the targeted nodes comprise a routing node and child nodes of the routing node;
consolidating confirmations of receipt of the message, as tokens, the tokens received from the child nodes that received the message and neighbor nodes of the routing node that received the message, based on the broadcast range of the message, the routing node determining if the message has been received at each of the child nodes and the neighbor nodes based on the consolidation of the tokens;
sending an acknowledgment from the routing node to the originator node as to receipt of the message by the child nodes and the neighbor nodes associated with the routing node and targeted for the message; and
configuring a hardware processor to execute instructions stored in a hardware memory, the instructions executed to enable the acts of receiving the message, consolidating, and sending the acknowledgement.

20. A computer-readable physical storage device comprising computer-executable instructions that when executed by a processor, cause the processor to perform a method comprising acts of:
  after all nodes are joined in a collection of nodes, receiving a message and a corresponding broadcast range with the message, from an originator node, the broadcast range identifies nodes targeted for the message, the targeted nodes comprise a routing node and child nodes of the routing node;
  consolidating confirmations of receipt of the message, as tokens, the tokens received from the child nodes that received the message and neighbor nodes of the routing node that received the message, based on the broadcast range of the message, the routing node determining if the message has been received at each of the child nodes and the neighbor nodes based on the consolidation of the tokens; and
  sending an acknowledgment from the routing node to the originator node as to receipt of the message by the child nodes and the neighbor nodes associated with the routing node and targeted for the message.

21. A computer-readable physical storage device comprising computer-executable instructions that when executed by a processor enable a communications system to serve as a routing node of a collection of nodes, controlling the system to perform:
  after all nodes are joined into the collection of nodes, receiving a message broadcast to neighbor nodes and other nodes associated with the routing node, the message accompanied by a broadcast range which identifies the neighbor nodes and the other nodes targeted for the message;
  receiving and consolidating confirmations of receipt of the message as a set of tokens, the tokens received from the other nodes of a routing node that received the message and the neighbor nodes of the routing node that received the message, the routing node determines if the message has been received at each of the neighbor nodes and the other nodes associated with the routing node based on the set of tokens; and
  sending an acknowledgement from the routing node to an originator node of the message as to receipt of the message by nodes designated in the broadcast range.

22. A computer-implemented communications system serving as a routing node of a collection of nodes, the system comprising:
  a hardware processor configured to process data;
  a data storage device configured to store instructions which, upon execution of the instructions by the hardware processor, control the communications system to perform:
    after all nodes are joined into the collection of nodes, receiving a message broadcast to neighborhood nodes and other nodes associated with the routing node, the message accompanied by a broadcast range which identifies the neighborhood nodes and the other nodes targeted for the message;
    consolidating confirmations of receipt of the message, as tokens, the tokens received from the neighborhood nodes that received the message and other nodes associated with the routing node that received the message, the routing node determines if the message has been received at each of the neighborhood nodes and the other nodes associated with the routing node based on the set of tokens; and
    sending an acknowledgement from the routing node to an originator node of the message as to receipt of the message by nodes designated in the broadcast range.

23. A method, the method comprising:
  receiving, by a computing device, a message broadcast to neighbor nodes and other nodes associated with the computing device routing node, the message accompanied by a broadcast range which identifies the neighbor nodes and the other nodes targeted for the message;
  receiving and consolidating confirmations of receipt of the message as a set of tokens, the tokens received from the other nodes associated with the computing device that received the message and the neighbor nodes associated with the computing device that received the message;
  determining, by the computing device, if the message has been received at each of the neighbor nodes and the other nodes associated with the computing device based on the set of tokens; and
  sending an acknowledgement from the computing device to an originator node of the message as to receipt of the message by nodes designated in the broadcast range.

24. The method of claim 23, the method comprising:
  forwarding the message to one or more nodes from which acknowledgements of message was not received.

25. The method of claim 23, wherein the computing device is acting as a routing node for nodes in a neighborhood of the computing device.

* * * * *